United States Patent
MacKay

(10) Patent No.: US 7,299,638 B2
(45) Date of Patent: Nov. 27, 2007

(54) COMBINED HEAT AND POWER SYSTEM

(76) Inventor: Robin MacKay, 6626 Locklenna La., Rancho Palos Verdes, CA (US) 90275

( * ) Notice: Subject to any disclaimer, the term of this patent is extended or adjusted under 35 U.S.C. 154(b) by 751 days.

(21) Appl. No.: 10/703,346

(22) Filed: Nov. 6, 2003

(65) Prior Publication Data

US 2005/0072164 A1    Apr. 7, 2005

Related U.S. Application Data

(60) Provisional application No. 60/513,261, filed on Oct. 21, 2003, provisional application No. 60/499,178, filed on Aug. 29, 2003.

(51) Int. Cl.
*F02C 6/18* (2006.01)

(52) U.S. Cl. ............. 60/784; 60/39.13; 237/12.1; 290/2

(58) Field of Classification Search ........... 60/39.13, 60/39.182, 784; 237/12.1; 290/2
See application file for complete search history.

(56) References Cited

U.S. PATENT DOCUMENTS

| | | | |
|---|---|---|---|
| 3,678,284 A * | 7/1972 | Peters | 290/1 R |
| 3,944,837 A * | 3/1976 | Meyers et al. | 290/40 R |
| 4,280,327 A | 7/1981 | Mackay | |
| 4,347,711 A | 9/1982 | Noe et al. | |
| 5,903,060 A * | 5/1999 | Norton | 290/2 |

OTHER PUBLICATIONS

David Gordon Wilson, "The Design of High-Efficiency Turbomachinery and Gas Turbines", published by MIT Press in 1984, Section 3.10, pp. 135-140.

* cited by examiner

*Primary Examiner*—L. J. Casaregola
(74) *Attorney, Agent, or Firm*—Cislo & Thomas, LLP

(57) ABSTRACT

A combined heat and power system that may be ON/OFF controlled by the thermal load requirements for the system and/or operated at or below atmospheric pressure.

3 Claims, 5 Drawing Sheets

COMBINED HEAT AND POWER SYSTEM

PRIORITY INFORMATION

This application claims the benefit of U.S. Provisional Application No. 60/513,261 filed Oct. 21, 2003, and U.S. Provisional Application No. 60/499,178 filed Aug. 29, 2003, the entire disclosures of which are incorporated herein by reference.

TECHNICAL FIELD

This invention relates to the general field of gas turbines and more particularly to gas turbines in a combined heat and power system.

BACKGROUND OF THE INVENTION

Combined heat and power systems or CHP systems are a well-accepted technology. Also known as cogeneration, many thousands of examples are installed and operating throughout the world. One of the most common versions uses a gas turbine to drive an electrical generator to produce electricity. At the same time, during this electrical energy generation, when available the heat from the gas turbine exhaust can be utilized to produce thermal energy in the form of steam, hot water or hot air. The thermal energy can be used for a myriad of applications, including comfort heating and domestic water heating as well as for air conditioning using an absorption chiller.

A typical prior art CHP system is shown in FIG. 1. While natural gas is the preferred and most commonly used fuel in CHP systems, and natural gas will be referred to as the fuel in this application, it must be recognized that other fuels may be equally applicable and can be readily used.

Ambient air 10 is compressed in compressor 12 to several atmospheres. The compressed air then enters combustor 14. Natural gas 16 has been compressed by natural gas compressor 18 to a pressure that is high enough to flow through modulating fuel valve 20 and into the elevated pressure in combustor 14 where it burns with the ambient air. The hot combustion gases leave combustor 14 and expand through turbine 22 before going through bypass valve 26 that allows the hot gas turbine exhaust gases to go through heat recovery unit 28 or to bypass it. Bypass valve 26 modulates so that enough hot gases go through heat recovery unit 28 to match the thermal load. The rest of the hot exhaust gases bypass the heat recovery unit 28 and are discharged to atmosphere along with the discharge from heat recovery unit 28.

The turbine 22 drives compressor 12 through shaft 24. It also drives motor/generator 30 through shaft 24, compressor 12, shaft 32, gearbox 34 and shaft 36. Motor/generator 30, such as an induction motor/generator, usually produces 60 Hz. or 50 Hz. power. The electrical output of motor/generator 30 goes through breaker 38 to electric load 40.

Starter motor 42 is powered by battery pack 44 that is charged by battery charger 46. The modulating fuel valve 20 controls the flow of fuel to regulate the electrical output.

In recent years, microturbines have been used in CHP systems. A microturbine is generally defined as a small turbogenerator in which the gas turbine is normally utilized with a permanent magnet rotor rotatably driven within an electrical winding by the gas turbine.

The microturbine CHP system concept is essentially the same but with two significant differences which are shown in prior art FIG. 2. The gearbox 34, shaft 36, generator 30 and starter 42 that were shown in FIG. (1) have been deleted and replaced with motor/generator 50 that turns at the same speed as compressor 12 and turbine 22. As motor/generator 50 turns at a very high rate of speed, it puts out high frequency power. Thus rectifier/inverter 52 is added to rectify the output of motor/generator 50 to direct current and then invert it to a more usable frequency such as 60 Hz. or 50 Hz. As motor/generator 50 is a motor as well as being a generator, it is used as a starter motor and receives its energy from rectifier/inverter 52 that receives its power from battery pack 44 which is kept charged by charger 46.

The other significant difference is that most microturbines use recuperators. FIG. 2 shows recuperator 54 which preheats the air leaving compressor 12 before it goes to combustor 14 by using the heat in the discharge of turbine 22 before it goes to bypass valve 26. This reduces the fuel consumption of the microturbine but also reduces the available thermal energy. Therefore some microturbines used for CHP systems do not have recuperators.

In general, gas turbines are used in those applications where individual units are rated at 500 kW or more, while microturbines are used in applications where individual units are rated from 30 kW to 200 kW.

Maximum efficiency in a CHP system occurs when all of the electrical and thermal energies are used beneficially. Thus, it is very hard to achieve efficient operation, and therefore economic operation, when the loads change rapidly and substantially. Residential applications are particularly difficult as electric loads may spike as various appliances are used. Correspondingly, the loads may drop to close to zero during periods when the sole loads are items such as electric clocks. At the same time, the thermal loads change precipitously as comfort heating and domestic water heating units cycle ON and OFF. Many commercial facilities have these same concerns.

The cost of a CHP system is generally too high to be considered for small residential or commercial loads. Although the rotor groups could easily be derived from turbochargers, which have annual production rates in the millions and are therefore inexpensive, the need for precision controls, starting mechanisms, recuperators, fuel gas compressors and heat recovery units with bypasses drive up the cost.

If the generator is not paralleled with the utility, precision controls are needed to maintain voltage and frequency. If the generator is to be paralleled with the utility, precision controls will be needed to bring the electrical output to the correct voltage, frequency and phase before paralleling. These controls also monitor the loads and match the generator output to the load. A critical need is to control fuel flow during startup so that the generator set will accelerate to its operational speed without overheating. An additional function is to control the bypass on the exhaust heat recovery unit so that the thermal output matches the thermal load.

The starting mechanism generally consists of a starter motor, the appropriate electrical and mechanical devices to engage and disengage the motor, and the source of starting energy that is generally batteries. These batteries usually have an associated charger.

Recuperators tend to be the most expensive single component in gas turbines and microturbines that are so equipped. They transfer heat from the turbine exhaust into the air entering the combustor to reduce fuel consumption and improve efficiency.

The exhaust heat recovery units need bypasses so that the output can be reduced. CHP systems that are not paralleled with the grid operate at electrical power outputs that match the electric load. This also determines the thermal output.

When the thermal loads are less than the thermal output, the bypass reduces the output to match the load, thus wasting energy and reducing system efficiency. A typical example of reduced thermal load would be when the thermal output is used for heating or air conditioning and the weather is mild.

The combustors of conventional gas turbines operate at several atmospheres of pressure. If the fuel is natural gas, it must be compressed to a pressure higher than that of the combustor or it will not flow into the combustor. These gas compressors are expensive and tend to be inefficient thus imposing a significant parasitic load on the CHP system and further reducing the efficiency.

SUMMARY OF THE INVENTION

The present invention is a combined heat and power system where the system is controlled to the thermal load so that the system always functions as its greatest efficiency. Another aspect of the present invention is a combined heat and power system which operates with the combustor at atmospheric pressure or below.

DETAILED DESCRIPTION OF THE PREFERRED EMBODIMENTS

The preferred thermodynamic cycle for use by the CHP system of the present invention is a subatmospheric Brayton cycle that was developed in the 1970's. Also referred to as an inverted Brayton cycle, it is described in detail in Section 3.10 "The inverted Brayton cycle" on pages 135-140 of David Gordon Wilson's book "The Design of High-Efficiency Turbomachinery and Gas Turbines" published by the MIT Press in 1984.

The cycle is further described in U.S. Pat. No. 4,280,327 entitled "Solar Powered Turbine System" issued Jul. 28, 1981 to Robin Mackay, and U.S. Pat. No. 4,347,711 entitled "Heat Actuated Space Conditioning Unit with Bottoming Cycle" issued to James C. Noe and David W. Friedman on Sep. 7, 1982, both of which are incorporated herein by reference.

The basic concept is to create a heating system that operates in cyclical fashion such as a residential or commercial water heater or a furnace which typically operates in the full-ON or full-OFF mode. Thus, when the heating system is required and turned ON, the system starts and provides the heat using the rejected heat from the gas turbine. Simultaneously, the system produces electricity in parallel with the facility's electric system and can reduce the amount generated by and purchased from the electric utility. If the power produced is more than the facility is consuming, the additional power can be delivered to the utility for sale or for credit against future or past purchases of electricity.

Figure 1:
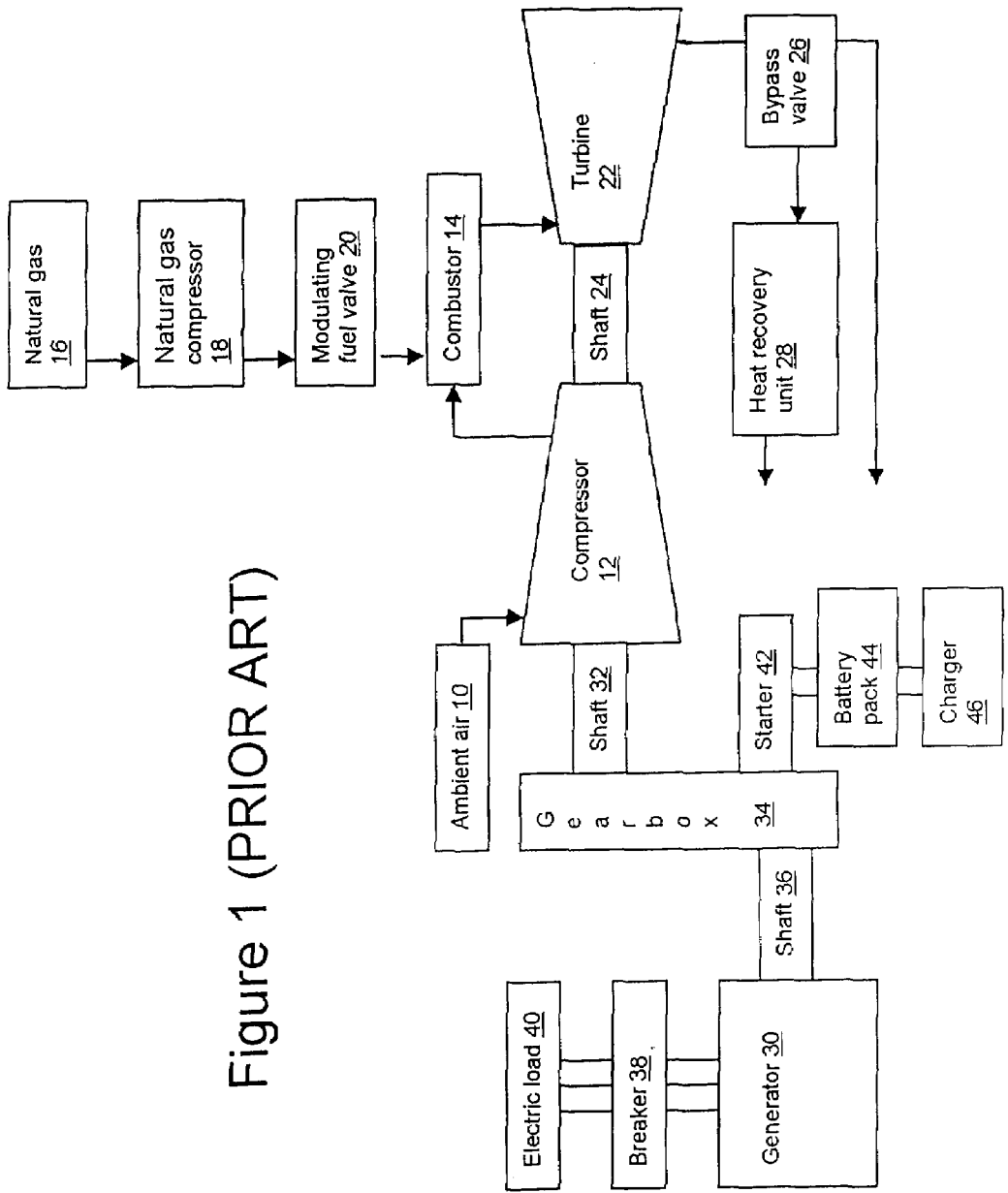
FIG. 1 is a schematic block diagram of a prior art gas turbine CHP system.
Figure 2:
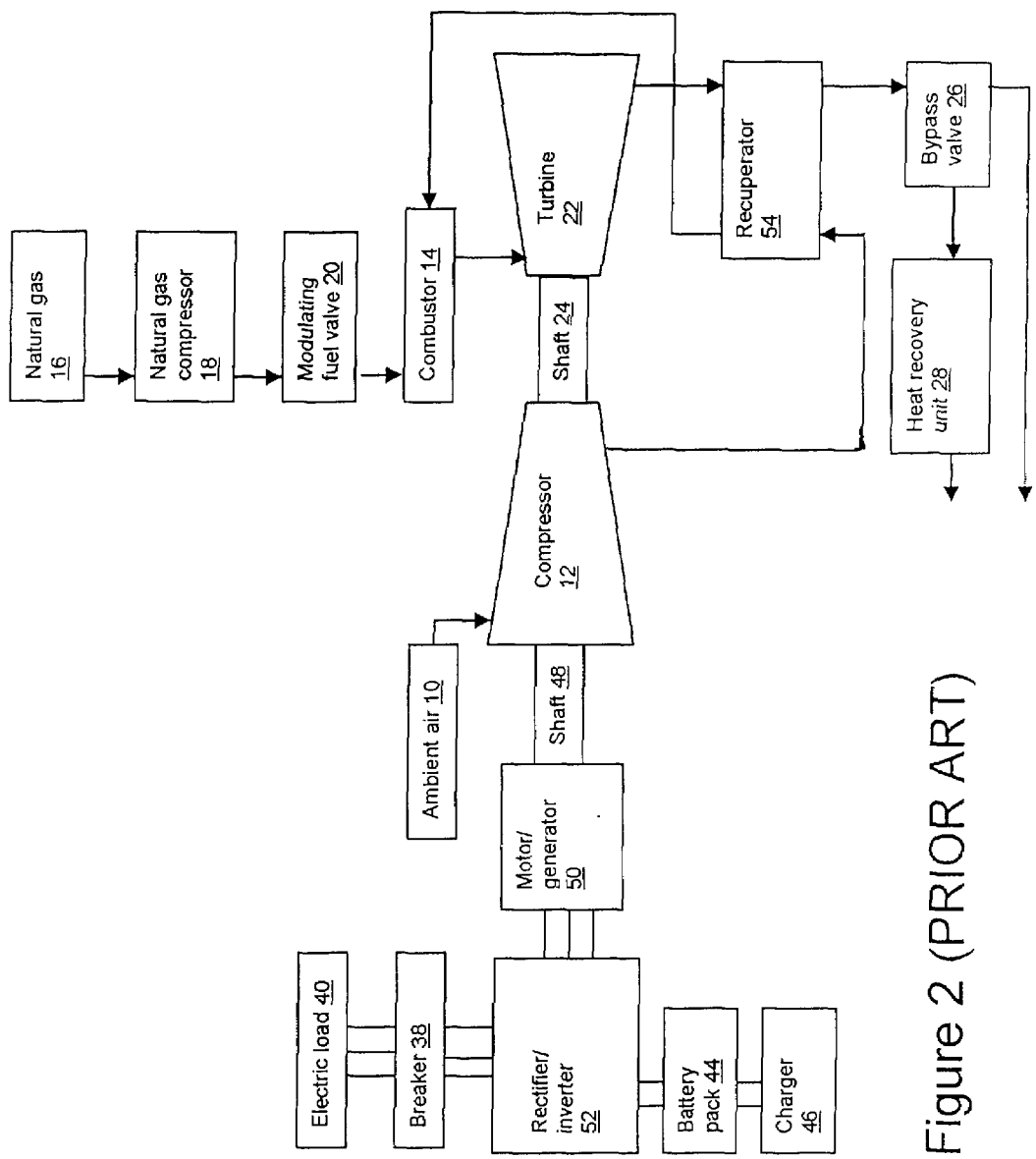
FIG. 2 is a schematic block diagram of a prior art microturbine CHP system.
Figure 3:
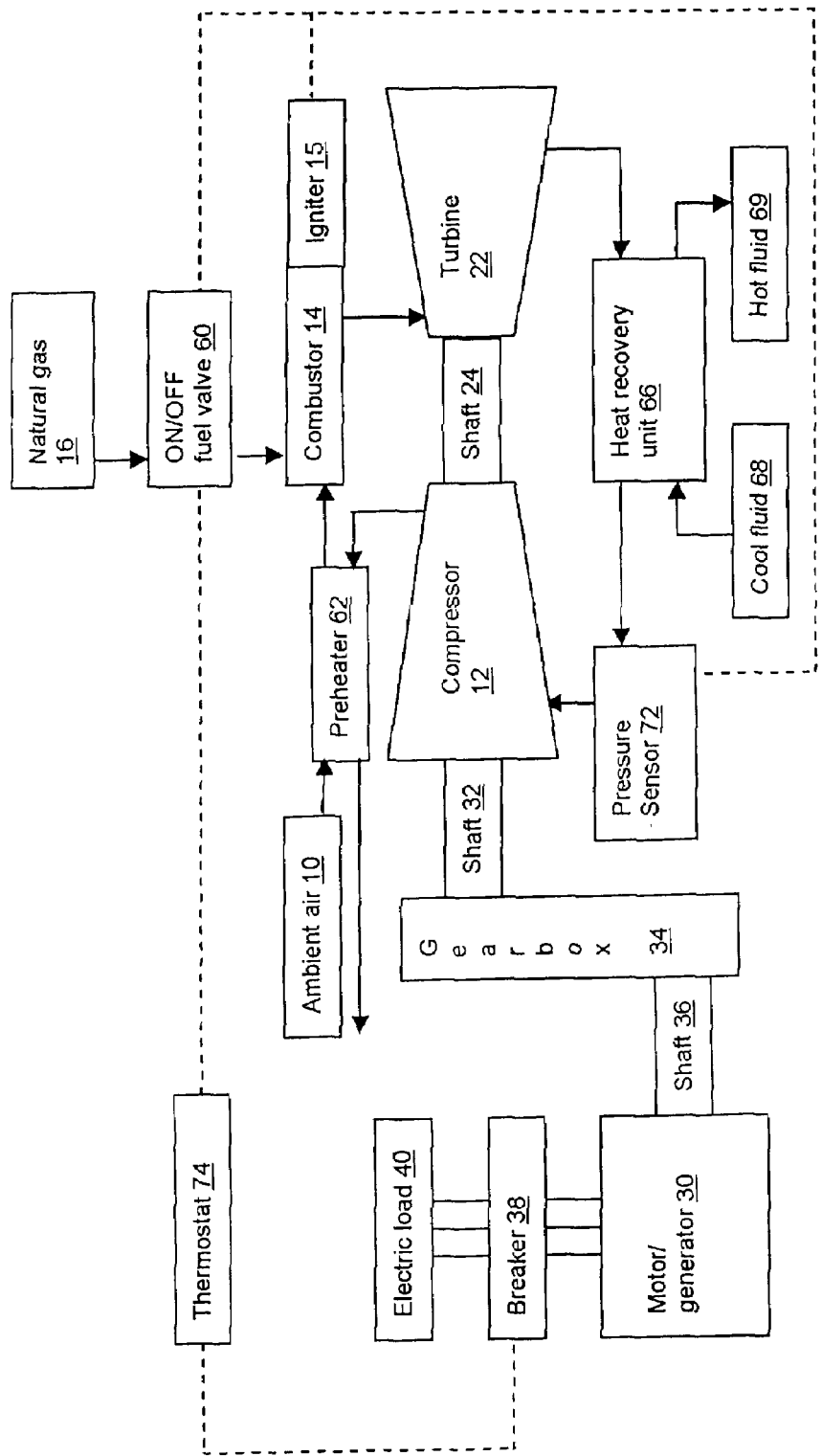
FIG. 3 is a schematic block diagram of the CHP system of the present invention.

FIG. 3 illustrates the preferred embodiment of the concept. The solid lines terminating in arrowheads show fluid flow, the dashed lines show control wires, and the three solid lines between electric load 40 and breaker 38 and between breaker 38 and motor/generator 30 show power wires.

Breaker 38, which connects the electric load 40 to induction motor/generator 30, is normally open. As the electric load 40 is connected to the facility's electrical system and/or the electric utility grid, it becomes a source of power for motor/generator 30 to act as a motor and start the system. Motor/generator 30 is mechanically connected through shaft 36 to the low-speed shaft of gearbox 34. The high-speed shaft of gearbox 34 is mechanically connected through shaft 32 to compressor 12 which is mechanically connected through shaft 24 to turbine 22.

If breaker 38 was closed and no further actions were taken, motor/generator 30 would accelerate to its synchronous speed less its slip angle. Thus, as an example, if motor/generator 30 had two poles and was operating on 60-Hertz power, the synchronous speed would be 3600 rpm. With a slip angle of five percent, motor/generator 30 would run at 3420 rpm. If gearbox 34 had a step-up gear ratio of twenty, compressor 12 and turbine 22 would run at 68,400 rpm.

Thermostat 74 is located where it can monitor the temperature of the fluid to be heated. When thermostat 74 senses that heat is needed, it sends a signal to ON/OFF fuel valve 60 enabling it but not opening it. Simultaneously, thermostat 74 sends a signal to breaker 38 closing it which allows current from electric load 40 to energize motor/generator 30 causing it to rotate and in turn causing shaft 36, gearbox 34, shaft 32, compressor 12, shaft 24 and turbine 22 all to rotate. Compressor 12 pulls a partial vacuum in pressure sensor 72 and heat recovery unit 66. Ambient air 10 flows through preheater 62, combustor 14 and turbine 22 into this partial vacuum. When the pressure sensed by pressure sensor 72 drops to a predetermined pressure, pressure sensor 72 sends a signal to igniter 15 tuning it on. Simultaneously, it sends a signal to ON/OFF fuel valve 60 that has already been enabled by thermostat 74 and allows it to open after a predetermined delay to ensure that igniter 15 has had time to function. Igniter 15 incorporates a timer that shuts off ignition after a predetermined period.

Natural gas 16 can now flow through ON/OFF fuel valve 60 to combustor 14 where it is mixed with ambient air 10 which has been preheated in preheater 62 and the mixture is then burned. The hot gases from combustor 14 are expanded through turbine 22 into the partial vacuum in heat recovery unit 66. The gases then flow through pressure sensor 72 and are compressed back to close to atmospheric pressure by compressor 12. The gases are then discharged to atmosphere by going through preheater 62 where they preheat the incoming ambient air 10.

With the increased temperature, turbine 22 now produces more power than that being absorbed by compressor 12. This surplus power accelerates the rotating components through and above the synchronous speed of motor/generator 30 which now produces power that it sends through breaker 38 into the electric load 40 where it is used by the facility and/or delivered to the electric utility for sale or for credit against electricity purchased in the past or the future.

Heat recovery unit 66 is shown as a heat exchanger where cool fluid 68 is heated and comes out as hot fluid 69. However, heat recovery unit 66 may also store the heated product inside it as in a domestic water heater.

When the thermostat 74 senses that no more heat is required, it sends signals to ON/OFF fuel valve 60 closing it, and to breaker 38 opening it. The system then shuts down.

All of the components in the system are low cost and either off-the-shelf items or are similar in design to off-the-shelf components. Breaker 38, motor/generator 30, pressure sensor 72 and thermostat 74 should be off-the-shelf items while the gearbox 34 uses conventional technology. Compressor 12, shaft 24, and turbine 22, are directly derived from turbochargers that are currently produced in quantities of several million per year. If heat recovery unit 66 is designed to produce hot water, it will be similar to residential or commercial water heaters without the burner. If heat recovery unit 66 is designed to produce hot air, it will be similar to residential or commercial furnaces but without the burner. ON/OFF fuel valve 60, combustor 14, and igniter 15 should be similar to those used in residential or commercial clothes dryers, water heaters or furnaces as they operate with low-pressure fuel and ambient pressure air and do not modulate. Shafts 36 and 32 are easily fabricated. A wide variety of control systems can be used. As an example, an rpm sensor could be used in lieu of pressure sensor 72.

The CHP system of the present invention only operates at full efficiency as it is designed to replace heating systems such as hot air furnaces or domestic water heaters that operate at maximum heating or are OFF. Therefore it only operates at full thermal load. It also operates at full electrical output as the electricity produced is either used in the facility, or sent to the electric utility.

Figure 4:
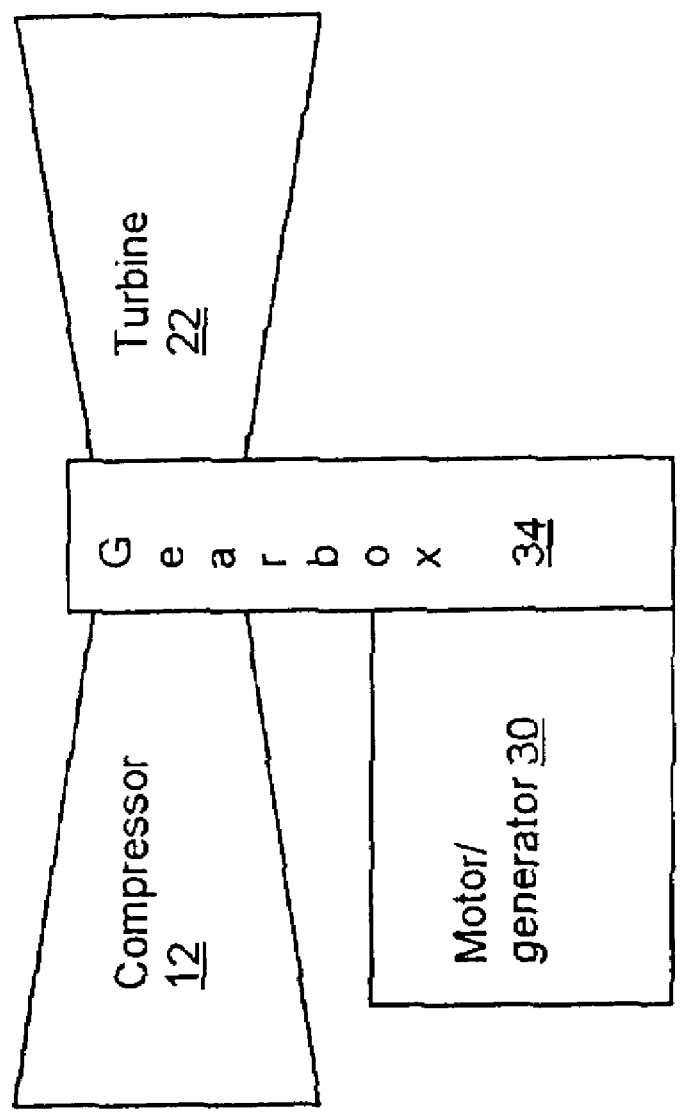
FIG. 4 is a schematic block diagram of the CHP system of the present invention having its rotating components integrated.

The preferred embodiment of the CHP system of the present invention is shown in FIG. 3 and described above. As illustrated in FIG. 4, an alternative would be to integrate motor/generator 30, gearbox 34, compressor 12, and turbine 22 so that motor/generator 30, compressor 12, and turbine 22 are close-coupled to and suspended off gearbox 34.

Figure 5:
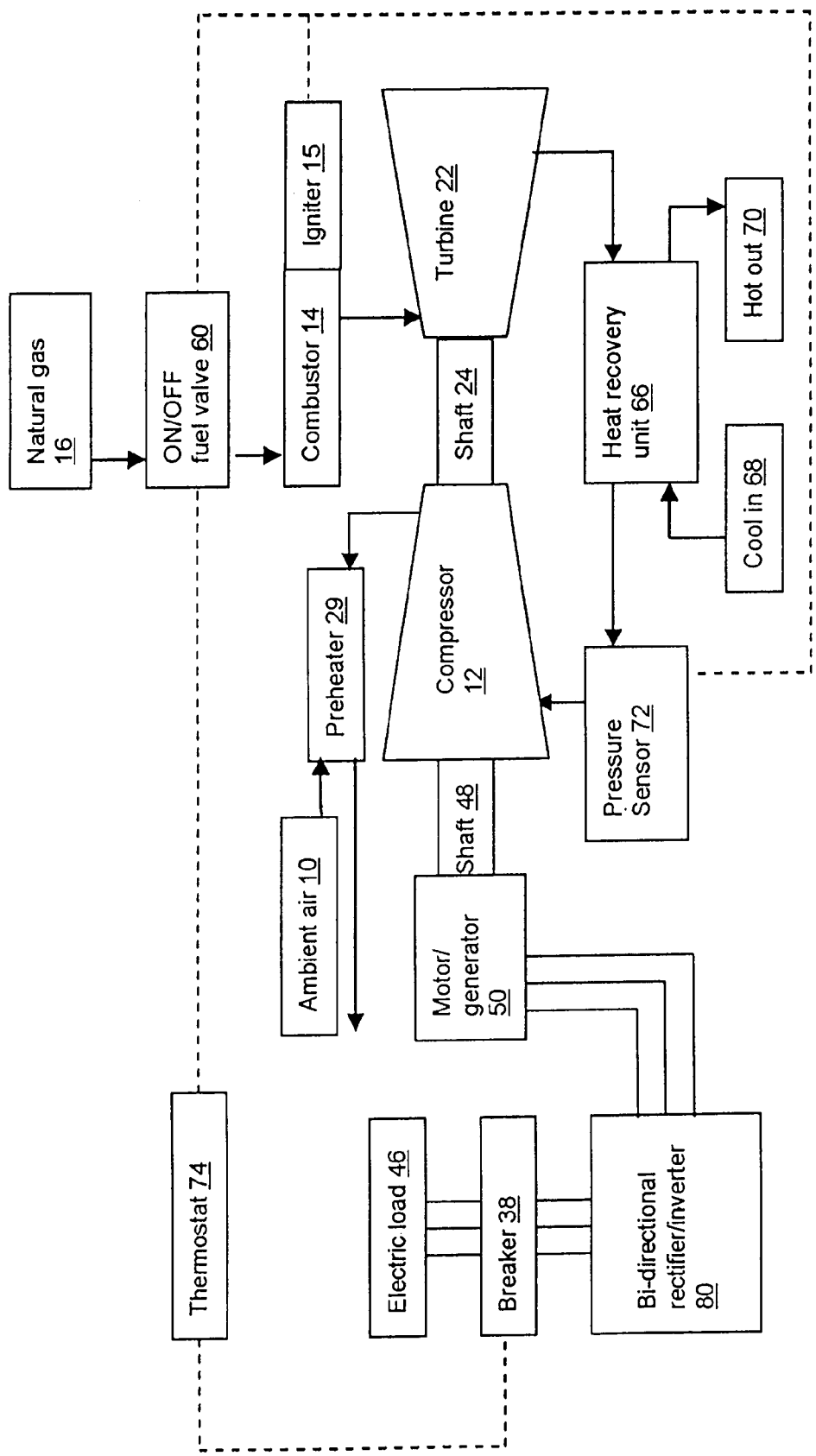
FIG. 5 is a schematic block diagram of the CHP system of the present invention having a high speed motor/generator.

As shown in FIG. 5, another alternative would be to replace the motor/generator 30, shaft 36, and gearbox 34 of FIG. 3 with a bi-directional rectifier/inverter 80 and high-speed motor/generator 50. The operation is identical to that described with respect to FIG. 3 except that the high speed motor/generator operates at the same speed as compressor 12 and turbine 22. It does, however, require the bi-directional inverter 80 to match the frequency of the electric utility to that of high speed motor/generator 50.

The CHP system of the present invention defines a system that does not require precision controls, a starter motor, starting batteries, battery charger, recuperator, heat recovery bypass or fuel gas compressor. It is very efficient as it only operates with full electrical and thermal output. It is suitable for residential, commercial and other applications. In general, it uses either readily available, inexpensive components, or components that are derived from ones that are currently in mass production.

While specific embodiments of the invention have been illustrated and described, it is to be understood that these are provided by way of example only and that the invention is not to be construed as being limited thereto but only by the proper scope of the following claims.

What I claim is:

1. A combined heat and power system, comprising:
    a gas turbine including a compressor, a turbine, a combustor, ON/OFF fuel valve, and a motor/generator;
    a source of fuel to supply fuel to said combustor through said ON/OFF fuel valve to be mixed with ambient air and combusted in said combustor to provide combustion gases for expansion in said turbine which drives said compressor and said motor/generator;
    a heating/cooling system to receive the expanded combustion products from said turbine and heat a fluid in said heating/cooling system; and
    means operably associated with said heating/cooling system to control operation of the combined heat and power system in response to the thermal requirements of said heating/cooling system;
    said motor/generator producing electrical power when the combined heat and power system is ON to meet the thermal requirements of said heating/cooling system;
    wherein said control means includes a breaker operably connecting said motor/generator and an electrical load, a thermostat operably connecting said breaker and said ON/OFF fuel valve, and a pressure sensor operably connecting said ON/OFF fuel valve and said compressor.

2. The combined heat and power system of claim 1, wherein said combustor includes an igniter operably connected to said ON/OFF fuel valve and said pressure sensor.

3. The combined heat and power system of claim 1, and in addition, a preheater operably disposed between said compressor and said combustor to heat the ambient air provided to said combustor.

* * * * *